US009265119B2

(12) United States Patent  
Catalano et al.

(10) Patent No.: US 9,265,119 B2  
(45) Date of Patent: Feb. 16, 2016

(54) SYSTEMS AND METHODS FOR PROVIDING THERMAL FOLD-BACK TO LED LIGHTS

(71) Applicant: TerraLUX, Inc., Longmont, CO (US)

(72) Inventors: Anthony W. Catalano, Boulder, CO (US); Anthony N. McDougle, Lafayette, CO (US)

(73) Assignee: TerraLUX, Inc., Longmont, CO (US)

( * ) Notice: Subject to any disclaimer, the term of this patent is extended or adjusted under 35 U.S.C. 154(b) by 57 days.

(21) Appl. No.: 13/919,742

(22) Filed: Jun. 17, 2013

(65) Prior Publication Data

US 2014/0368130 A1    Dec. 18, 2014

(51) Int. Cl.
| | |
|---|---|
| F21V 23/00 | (2015.01) |
| H05B 33/08 | (2006.01) |
| H05B 33/10 | (2006.01) |
| F21K 99/00 | (2010.01) |
| F21Y 101/02 | (2006.01) |

(52) U.S. Cl.
CPC ............ H05B 33/0884 (2013.01); F21K 9/135 (2013.01); F21V 23/00 (2013.01); *F21Y 2101/02* (2013.01); *Y10T 29/49117* (2015.01)

(58) Field of Classification Search
CPC ........... H05B 33/0854; H05B 33/0872; H05B 33/0803; H05B 33/0851; G09G 2320/041; G09G 3/3406; Y02B 20/202; Y02B 20/383; F21V 23/003; F21V 23/0442; F21V 25/10
USPC ................. 315/309, 297, 307; 362/800, 276; 327/513
See application file for complete search history.

(56) References Cited

U.S. PATENT DOCUMENTS

| | | | |
|---|---|---|---|
| 4,085,403 | A | 4/1978 | Meier et al. |
| 4,529,949 | A | 7/1985 | De et al. |
| 4,633,161 | A | 12/1986 | Callahan et al. |
| 4,685,037 | A | 8/1987 | Akiyama et al. |
| 5,291,607 | A | 3/1994 | Ristic et al. |
| 5,334,916 | A | 8/1994 | Noguchi |
| 5,401,099 | A | 3/1995 | Nishizawa et al. |
| 5,485,576 | A | 1/1996 | Fee et al. |
| 5,506,490 | A | 4/1996 | Demuro |
| 5,546,041 | A | 8/1996 | Szajda |
| 5,606,510 | A | 2/1997 | Glaser et al. |
| 5,661,645 | A | 8/1997 | Hochstein |
| 5,691,605 | A | 11/1997 | Xia et al. |
| 5,781,040 | A | 7/1998 | Myers |
| 5,783,909 | A | 7/1998 | Hochstein |
| 5,925,990 | A | 7/1999 | Crouse et al. |

(Continued)

FOREIGN PATENT DOCUMENTS

| | | |
|---|---|---|
| AU | 2010363633 A1 | 7/2012 |
| AU | 2010204851 B2 | 10/2013 |

(Continued)

OTHER PUBLICATIONS

Extended Search Report issued for European Patent Application No. 10732010.3, mailed on Nov. 29, 2013, 7 pages.

(Continued)

*Primary Examiner* — Alexander H Taningco  
*Assistant Examiner* — Christian L Garcia  
(74) *Attorney, Agent, or Firm* — Neugeboren O'Dowd PC

(57) ABSTRACT

In various embodiments, a module for providing thermal fold-back protection to an illumination device includes a housing, at least one temperature sensor, and thermal foldback circuitry.

20 Claims, 5 Drawing Sheets

(56) References Cited

U.S. PATENT DOCUMENTS

| | | |
|---|---|---|
| 5,942,860 A | 8/1999 | Huynh |
| 5,994,884 A | 11/1999 | Paterno |
| 6,069,457 A | 5/2000 | Bogdan et al. |
| 6,153,985 A | 11/2000 | Grossman |
| 6,166,491 A | 12/2000 | Tsuchiya et al. |
| 6,225,759 B1 | 5/2001 | Bogdan et al. |
| 6,313,589 B1 | 11/2001 | Kobayashi et al. |
| 6,332,710 B1 | 12/2001 | Aslan et al. |
| 6,351,079 B1 | 2/2002 | Willis |
| 6,382,812 B1 | 5/2002 | Hsu |
| 6,429,598 B1 | 8/2002 | Haley |
| 6,459,257 B1 | 10/2002 | Köck |
| 6,515,437 B1 | 2/2003 | Zinkler et al. |
| 6,621,239 B1 | 9/2003 | Belliveau |
| 6,693,394 B1 | 2/2004 | Guo et al. |
| 6,713,974 B2 | 3/2004 | Patchornik et al. |
| 6,762,629 B2 | 7/2004 | Tam et al. |
| 6,842,668 B2 | 1/2005 | Carson et al. |
| 6,870,325 B2 | 3/2005 | Bushell et al. |
| 6,930,737 B2 | 8/2005 | Weindorf et al. |
| 7,029,145 B2 | 4/2006 | Frederick |
| 7,034,507 B2 | 4/2006 | Lovett |
| 7,049,765 B1 | 5/2006 | Tremaine, Sr. |
| 7,119,498 B2 | 10/2006 | Baldwin et al. |
| 7,126,290 B2 | 10/2006 | Elliott |
| 7,150,561 B1 | 12/2006 | D'Aquino et al. |
| 7,186,000 B2 | 3/2007 | Lebens et al. |
| 7,196,481 B2 | 3/2007 | Bushell et al. |
| 7,204,638 B2 | 4/2007 | Hsu |
| 7,233,258 B1 | 6/2007 | Gelinas |
| 7,242,150 B2 | 7/2007 | DeJonge et al. |
| 7,245,089 B2 | 7/2007 | Yang |
| 7,245,090 B2 | 7/2007 | Yang |
| 7,262,559 B2 | 8/2007 | Tripathi et al. |
| 7,286,123 B2 | 10/2007 | Yang |
| 7,322,718 B2 | 1/2008 | Setomoto et al. |
| 7,330,002 B2 | 2/2008 | Joung |
| 7,336,434 B2 | 2/2008 | Lille et al. |
| 7,344,279 B2 | 3/2008 | Mueller et al. |
| 7,358,679 B2 | 4/2008 | Lys et al. |
| 7,423,750 B2 | 9/2008 | Hoshizaki et al. |
| 7,429,129 B2 | 9/2008 | St. Pierre et al. |
| 7,486,030 B1 | 2/2009 | Biggs |
| 7,492,108 B2 | 2/2009 | Garcia et al. |
| 7,504,781 B2 | 3/2009 | Wendt et al. |
| 7,504,783 B2 | 3/2009 | Zarr |
| 7,507,001 B2 | 3/2009 | Kit |
| 7,510,303 B2 | 3/2009 | Jonsson et al. |
| 7,546,473 B2 | 6/2009 | Newman |
| 7,556,423 B2 | 7/2009 | Caliboso |
| 7,605,550 B2 | 10/2009 | Ferentz et al. |
| 7,612,506 B1 | 11/2009 | Yang et al. |
| 7,626,346 B2 | 12/2009 | Scilla |
| 7,628,507 B2 | 12/2009 | Allen et al. |
| 7,635,957 B2 | 12/2009 | Tripathi et al. |
| 7,656,307 B2 | 2/2010 | Yatsuda et al. |
| 7,656,371 B2 | 2/2010 | Shimizu et al. |
| 7,663,326 B2 | 2/2010 | Santo et al. |
| 7,728,401 B2 | 6/2010 | Takatori |
| 7,755,513 B2 | 7/2010 | Wang et al. |
| 7,775,692 B2 | 8/2010 | Li |
| 7,777,430 B2 | 8/2010 | Catalano et al. |
| 7,791,326 B2 | 9/2010 | Dahlman et al. |
| 7,792,167 B2 | 9/2010 | Kanesaka |
| 7,800,316 B2 | 9/2010 | Haug |
| 7,800,567 B2 | 9/2010 | Fujino |
| 7,812,551 B2 | 10/2010 | Hite et al. |
| 7,817,009 B2 | 10/2010 | Wang et al. |
| 7,817,453 B2 | 10/2010 | Nerone |
| 7,888,623 B2 | 2/2011 | Kawashima et al. |
| 7,888,877 B2 | 2/2011 | Tsai et al. |
| 7,888,942 B2 | 2/2011 | Chen et al. |
| 7,892,870 B2 | 2/2011 | Shi |
| 7,911,156 B2 | 3/2011 | Cottongim et al. |
| 7,911,438 B2 | 3/2011 | Okazaki |
| 7,947,947 B2 | 5/2011 | Ackermann et al. |
| 7,948,190 B2 | 5/2011 | Grajcar |
| 7,948,398 B2 | 5/2011 | Miller |
| 7,986,112 B2 | 7/2011 | West |
| 7,990,077 B2 | 8/2011 | Yu et al. |
| 7,994,725 B2 | 8/2011 | Bouchard |
| 8,198,834 B2 | 6/2012 | Maruyama et al. |
| 8,230,690 B1 | 7/2012 | Salessi |
| 8,283,877 B2 | 10/2012 | Lenk et al. |
| 8,292,482 B2 | 10/2012 | Harbers et al. |
| 8,310,171 B2 | 11/2012 | Reisenauer et al. |
| 8,317,372 B2 | 11/2012 | Fu et al. |
| 8,319,408 B1 | 11/2012 | Horng |
| 8,350,500 B2 | 1/2013 | Negley et al. |
| 8,358,081 B2 | 1/2013 | Panagotacos et al. |
| 8,358,085 B2 | 1/2013 | Catalano et al. |
| 8,366,503 B2 | 2/2013 | Chiang |
| 8,368,322 B2 | 2/2013 | Yu et al. |
| 8,371,717 B2 | 2/2013 | Lai |
| 8,476,847 B2 * | 7/2013 | Riesebosch .................. 315/309 |
| 8,686,666 B2 | 4/2014 | Catalano et al. |
| 8,791,655 B2 * | 7/2014 | Sadwick et al. ............. 315/309 |
| 8,896,231 B2 | 11/2014 | Brandt |
| 2002/0048177 A1 | 4/2002 | Rahm et al. |
| 2003/0015973 A1 | 1/2003 | Ovens et al. |
| 2003/0031037 A1 | 2/2003 | Piaskowski |
| 2003/0052658 A1 | 3/2003 | Baretich et al. |
| 2003/0123521 A1 | 7/2003 | Luoma |
| 2004/0164688 A1 | 8/2004 | Van Tichelen et al. |
| 2005/0057184 A1 | 3/2005 | Kaneko et al. |
| 2005/0057187 A1 | 3/2005 | Catalano |
| 2005/0062481 A1 | 3/2005 | Vaughn et al. |
| 2005/0237005 A1 | 10/2005 | Maxik |
| 2006/0038661 A1 | 2/2006 | Reinhold et al. |
| 2006/0119288 A1 | 6/2006 | Ayala et al. |
| 2006/0125773 A1 | 6/2006 | Ichikawa et al. |
| 2006/0152204 A1 | 7/2006 | Maksimovic et al. |
| 2006/0214876 A1 | 9/2006 | Jendbro et al. |
| 2006/0237636 A1 | 10/2006 | Lyons et al. |
| 2006/0238169 A1 | 10/2006 | Baker |
| 2006/0273741 A1 | 12/2006 | Stalker |
| 2007/0040512 A1 | 2/2007 | Jungwirth et al. |
| 2007/0040518 A1 | 2/2007 | Young |
| 2007/0057902 A1 | 3/2007 | Joung |
| 2007/0069656 A1 | 3/2007 | Huang |
| 2007/0116443 A1 | 5/2007 | Ptak |
| 2007/0121324 A1 | 5/2007 | Nakano |
| 2007/0273290 A1 | 11/2007 | Ashdown et al. |
| 2007/0285031 A1 | 12/2007 | Shteynberg et al. |
| 2007/0291483 A1 | 12/2007 | Lys |
| 2008/0018261 A1 | 1/2008 | Kastner |
| 2008/0062070 A1 | 3/2008 | De Oto et al. |
| 2008/0088557 A1 | 4/2008 | Choi |
| 2008/0111505 A1 | 5/2008 | Wang et al. |
| 2008/0122422 A1 | 5/2008 | Zhang et al. |
| 2008/0136334 A1 | 6/2008 | Robinson et al. |
| 2008/0150442 A1 | 6/2008 | Feldtkeller |
| 2008/0151965 A1 | 6/2008 | Kim |
| 2008/0180414 A1 | 7/2008 | Fung et al. |
| 2008/0198613 A1 | 8/2008 | Cruickshank |
| 2008/0203992 A1 | 8/2008 | Qahouq et al. |
| 2008/0204884 A1 | 8/2008 | Jang |
| 2008/0215279 A1 | 9/2008 | Salsbury et al. |
| 2008/0224633 A1 | 9/2008 | Melanson et al. |
| 2008/0231198 A1 | 9/2008 | Zarr |
| 2008/0238340 A1 | 10/2008 | Leung et al. |
| 2008/0258636 A1 | 10/2008 | Shih et al. |
| 2008/0273330 A1 | 11/2008 | Tyson |
| 2008/0287742 A1 | 11/2008 | St. George et al. |
| 2008/0319690 A1 | 12/2008 | Meadows et al. |
| 2009/0021178 A1 | 1/2009 | Furukawa et al. |
| 2009/0021955 A1 | 1/2009 | Kuang et al. |
| 2009/0033612 A1 | 2/2009 | Roberts et al. |
| 2009/0097244 A1 | 4/2009 | Lan et al. |
| 2009/0146584 A1 | 6/2009 | Ye et al. |
| 2009/0154525 A1 | 6/2009 | Dai et al. |
| 2009/0167203 A1 | 7/2009 | Dahlman et al. |
| 2009/0179574 A1 | 7/2009 | Chang |
| 2009/0179848 A1 | 7/2009 | Schmidt et al. |

(56) References Cited

U.S. PATENT DOCUMENTS

| | | |
|---|---|---|
| 2009/0212736 A1 | 8/2009 | Baarman et al. |
| 2009/0251059 A1 | 10/2009 | Veltman |
| 2009/0267523 A1 | 10/2009 | Phillips |
| 2009/0284958 A1 | 11/2009 | Pickard et al. |
| 2009/0289965 A1 | 11/2009 | Kurokawa et al. |
| 2009/0302783 A1 | 12/2009 | Wang et al. |
| 2009/0306912 A1 | 12/2009 | Chen et al. |
| 2010/0007588 A1 | 1/2010 | Zygmunt et al. |
| 2010/0033095 A1 | 2/2010 | Sadwick |
| 2010/0033112 A1 | 2/2010 | Yen |
| 2010/0039049 A1 | 2/2010 | Hoffman |
| 2010/0066270 A1 | 3/2010 | Yang et al. |
| 2010/0118057 A1 | 5/2010 | Atkins et al. |
| 2010/0134020 A1 | 6/2010 | Peng et al. |
| 2010/0157583 A1 | 6/2010 | Nakajima |
| 2010/0176734 A1 | 7/2010 | Haubmann |
| 2010/0176746 A1 | 7/2010 | Catalano et al. |
| 2010/0194368 A1 | 8/2010 | Taylor et al. |
| 2010/0203465 A1 | 8/2010 | Bria et al. |
| 2010/0225170 A1 | 9/2010 | Hjort et al. |
| 2010/0237787 A1 | 9/2010 | Vogler et al. |
| 2010/0244701 A1 | 9/2010 | Chen et al. |
| 2010/0259191 A1 | 10/2010 | Ghanem et al. |
| 2010/0264795 A1 | 10/2010 | Miao |
| 2010/0277077 A1 | 11/2010 | Pong et al. |
| 2010/0283397 A1 | 11/2010 | Chen et al. |
| 2010/0295474 A1 | 11/2010 | Chemel et al. |
| 2010/0295688 A1 | 11/2010 | Wu et al. |
| 2010/0301751 A1 | 12/2010 | Chobot et al. |
| 2010/0320939 A1 | 12/2010 | Lai |
| 2010/0327872 A1 | 12/2010 | Chen et al. |
| 2011/0001438 A1 | 1/2011 | Chemel et al. |
| 2011/0002070 A1 | 1/2011 | De Anna et al. |
| 2011/0019430 A1 | 1/2011 | Wilkinson et al. |
| 2011/0031903 A1 | 2/2011 | Nguyen Hoang et al. |
| 2011/0038715 A1 | 2/2011 | Frank et al. |
| 2011/0043120 A1 | 2/2011 | Panagotacos et al. |
| 2011/0062895 A1 | 3/2011 | Ji |
| 2011/0068715 A1 | 3/2011 | Hum |
| 2011/0080099 A1 | 4/2011 | Teng et al. |
| 2011/0089852 A1 | 4/2011 | Segan |
| 2011/0109231 A1 | 5/2011 | Shiu et al. |
| 2011/0115396 A1 | 5/2011 | Horvath et al. |
| 2011/0115399 A1 | 5/2011 | Sadwick et al. |
| 2011/0115400 A1 | 5/2011 | Harrison et al. |
| 2011/0115645 A1 | 5/2011 | Hall et al. |
| 2011/0121744 A1 | 5/2011 | Salvestrini et al. |
| 2011/0121751 A1 | 5/2011 | Harrison et al. |
| 2011/0121760 A1 | 5/2011 | Harrison et al. |
| 2011/0147466 A1 | 6/2011 | Kang et al. |
| 2011/0150028 A1 | 6/2011 | Nguyen Hoang et al. |
| 2011/0156593 A1 | 6/2011 | De Greef et al. |
| 2011/0157238 A1 | 6/2011 | Lin et al. |
| 2011/0163696 A1 | 7/2011 | Huang et al. |
| 2011/0199013 A1 | 8/2011 | Cottrell |
| 2011/0298374 A1 | 12/2011 | Lenk et al. |
| 2012/0001548 A1 | 1/2012 | Recker et al. |
| 2012/0051048 A1 | 3/2012 | Smit et al. |
| 2012/0068618 A1 | 3/2012 | Koski et al. |
| 2012/0113642 A1 | 5/2012 | Catalano |
| 2012/0249000 A1 | 10/2012 | Kawai et al. |
| 2012/0268040 A1 | 10/2012 | Riesebosch |
| 2012/0299481 A1 | 11/2012 | Stevens |
| 2012/0313117 A1 | 12/2012 | Lee et al. |
| 2012/0313520 A1 | 12/2012 | Canter et al. |
| 2012/0320582 A1 | 12/2012 | Hilscher et al. |
| 2012/0326623 A1* | 12/2012 | Fatt et al. ............... 315/291 |
| 2013/0027941 A1 | 1/2013 | Wheelock et al. |
| 2013/0033198 A1 | 2/2013 | Kang et al. |
| 2014/0217896 A1 | 8/2014 | Catalano et al. |

FOREIGN PATENT DOCUMENTS

| | | |
|---|---|---|
| AU | 2010363633 B2 | 4/2014 |
| CN | 2924996 Y | 7/2007 |
| CN | 102131324 A | 7/2011 |
| CN | 103025337 B | 10/2014 |
| CN | 104254178 A | 12/2014 |
| CN | 104302039 A | 1/2015 |
| DE | 19725710 A1 | 1/1998 |
| EP | 492117 A2 | 7/1992 |
| EP | 657697 A1 | 6/1995 |
| EP | 923274 A2 | 6/1999 |
| EP | 1271799 A1 | 1/2003 |
| EP | 1313353 A1 | 5/2003 |
| EP | 1701589 A1 | 9/2006 |
| EP | 1777792 A2 | 4/2007 |
| EP | 2051566 A2 | 4/2009 |
| EP | 2073607 A1 | 6/2009 |
| EP | 2273851 A2 | 1/2011 |
| EP | 2477459 A1 | 7/2012 |
| EP | 2501393 A2 | 9/2012 |
| GB | 2335334 A | 9/1999 |
| JP | 57-133685 U | 8/1982 |
| JP | 61-66564 A | 4/1986 |
| JP | 2003-188415 A | 7/2003 |
| JP | 2003-317979 A | 11/2003 |
| JP | 2004-296205 A | 10/2004 |
| JP | 2008-172999 A | 7/2008 |
| JP | 2008-224136 A | 9/2008 |
| JP | 2009-83590 A | 4/2009 |
| JP | 2013-517613 A | 5/2013 |
| KR | 1020000006665 A | 2/2000 |
| KR | 1020060098345 A | 9/2006 |
| KR | 1020070053818 A | 5/2007 |
| KR | 20090029123 A | 3/2009 |
| TW | 201204993 A | 2/2012 |
| WO | 90/10238 A2 | 9/1990 |
| WO | 99/00650 A1 | 1/1999 |
| WO | 00/17728 A2 | 3/2000 |
| WO | WO-2004047269 A2 | 6/2004 |
| WO | 2004/075606 A1 | 9/2004 |
| WO | 2005/081591 A1 | 9/2005 |
| WO | 2006/058418 A1 | 6/2006 |
| WO | WO-2007035390 A2 | 3/2007 |
| WO | 2007/147573 A1 | 12/2007 |
| WO | WO-2008008677 A2 | 1/2008 |
| WO | 2008/096249 A2 | 8/2008 |
| WO | 2009/055821 A1 | 4/2009 |
| WO | 2009/079944 A1 | 7/2009 |
| WO | WO-2010131961 A1 | 11/2010 |
| WO | 2010/137002 A1 | 12/2010 |
| WO | WO-2010142006 A2 | 12/2010 |
| WO | 2011/044040 A1 | 4/2011 |
| WO | 2011/051859 A1 | 5/2011 |
| WO | 2011/056242 A1 | 5/2011 |
| WO | 2011/114250 A1 | 9/2011 |
| WO | 2011/137646 A1 | 11/2011 |
| WO | 2011/145009 A1 | 11/2011 |
| WO | 2012/007798 A2 | 1/2012 |
| WO | WO-2012035430 A2 | 3/2012 |
| WO | WO-2012052875 A2 | 4/2012 |
| WO | 2012/087268 A2 | 6/2012 |
| WO | WO-2012087268 A2 | 6/2012 |
| WO | 2012/162601 A1 | 11/2012 |
| WO | WO-2012170869 A1 | 12/2012 |
| WO | WO-2013015498 A1 | 1/2013 |
| WO | 2012/087268 A3 | 2/2013 |
| WO | WO-2013017984 A1 | 2/2013 |
| WO | 2013/090904 A1 | 6/2013 |

OTHER PUBLICATIONS

International Application Serial No. PCT/US2010/020819, International Preliminary Report on Patentability mailed on Jul. 28, 2011, 7 pages.

International Application Serial No. PCT/US2010/020819, International Search Report and Written Opinion mailed on Aug. 13, 2010, 8 pages.

International Application Serial No. PCT/US2010/057060, International Preliminary Report on Patentability mailed on Jan. 24, 2013, 8 pages.

(56) References Cited

OTHER PUBLICATIONS

International Application Serial No. PCT/US2010/057060, International Search Report and Written Opinion mailed on Nov. 23, 2012, 11 pages.
International Application Serial No. PCT/US2011/051883, International Search Report and Written Opinion mailed on Feb. 6, 2012, 11 pages.
International Application Serial No. PCT/US2012/039558, International Preliminary Report on Patentability mailed on Dec. 5, 2013, 7 pages.
International Application Serial No. PCT/US2012/039558, International Search Report and Written Opinion mailed on Sep. 24, 2012, 8 pages.
International Application Serial No. PCT/US2012/070126, International Search Report mailed on May 6, 2013, 3 pages.
Prendergast, Patrick, "Thermal Design Considerations for High Power LED Systems", Cypress Semiconductor Corp., Published in Planet Analog, Mar. 2007, pp. 1-8.
Examination Report Received for Australian Patent Application No. 2012258584, mailed on Feb. 18, 2015, 4 pages.
Examination Report Received for Canadian Patent Application No. 2835875, mailed on Mar. 19, 2015, 3 pages.
First Examiner Report Received for Australian Patent Application No. 2012258584 mailed on May 20, 2014, 3 pages.
Notice of Decision to Grant Received for Chinese Patent Application No. 201080061588.1 mailed on Jun. 4, 2014, 4 pages (2 pages of the Official Copy and 2 pages of the English Translation).
Examiner Report Received for European Patent Application No. 10859616.4 mailed Oct. 28, 2014, 4 pages.
Examiner Report Received for Japanese Patent Application No. 2012-549988 mailed Oct. 2, 2014, 16 pages. (10 pages of English Translation and 6 pages of Official copy).
International Application Serial No. PCT/US2012/070126, International Preliminary Report on Patentability mailed Jun. 26, 2014, 8 pages.

* cited by examiner

SYSTEMS AND METHODS FOR PROVIDING THERMAL FOLD-BACK TO LED LIGHTS

TECHNICAL FIELD

In various embodiments, the present invention relates generally to illumination systems and methods incorporating light-emitting diodes (LEDs), and more specifically to such systems and methods that provide thermal fold-back capability thereto.

BACKGROUND

Unlike incandescent, halogen, metal halide, and fluorescent lights, LEDs are quite sensitive to elevated temperature. High temperatures reduce the light output of an LED as well as its lifetime. While temperatures above roughly 100° C. can shorten the lifetime of an LED, when combined with high operating currents such elevated temperatures are particularly damaging to the LED. While it is possible that high ambient operating temperatures may result from the local environment external to the fixture containing the LED, typically excessive operating temperatures are due to improperly designed or assembled light fixtures or failure of an LED cooling system (e.g., a fan). Currently LEDs are approximately 20% efficient, i.e., 20% of the incoming electrical energy is converted to light; the remaining 80% of the electrical energy is dissipated in the form of heat. If not removed from the vicinity of the LED, this dissipated heat can lead to deleteriously high LED operating temperatures and, consequently, shortened lifetimes.

In view of the foregoing, there is a need for systems and techniques for controlling the operating current of an LED in response to its operating temperature in order to prevent deleterious overheating. However, methods of controlling LED operating current are complicated by the fact that many LED-based illumination devices are dimmable; moreover, multiple different dimming techniques may be utilized. For example, two common dimming techniques are phase dimming and 0-10 V dimming, each of which controls the light output of the LED-based device in a different manner.

In phase dimming, a dimming controller such as a semiconductor-controlled rectifier (SCR) or a bidirectional triode thyristor (triac) reduces the power input by truncating the leading or trailing edge of the sinusoidally varying line voltage waveform. Driver electronics (typically designed to supply constant current to the LED) connected in series to the phase dimmer sense the duration of conduction, i.e., the phase angle, of the abbreviated waveform and reduce the current to the LED in response, resulting in decreased light output from the LED.

In 0-10 V (or similarly, 1-10 V) dimming, the 0-10 V analog power signal is connected to the two wires of a specially designed dimming LED driver. The dimmer, located remotely, produces a voltage signal that is accepted by the driver and is used via appropriate circuit elements to reduce the output current. In general, these analog dimmers have circuit elements that maintain electrical isolation from line voltage for safety.

Other types of dimming schemes such as Digitally Addressable Light Interface (DALI) or DMX512 also exist. DMX512 dimmers generate a digital signal that is de-multiplexed to a 0-10 V signal. DALI is a specialized bi-directional digital interface control that uses purpose-designed LED drivers.

The use of different techniques for dimming LED-based illumination systems complicates attempts to thermally protect the LEDs themselves, as current control for thermal protection may have different impacts on the light output of the system depending on the dimming system. Furthermore, current control may be incompatible with non-dimmable LED drivers, which are designed to supply a constant current level regardless of variations in input voltage. Thus, there is a need for systems and techniques of providing thermal fold-back protection to LED-based lighting systems and that are compatible with various types of dimming solutions.

SUMMARY

In accordance with various embodiments of the present invention, a modular and replaceable component provides thermal fold-back capability to LEDs and LED driver electronics that do not natively contain such a feature. When connected within a lighting system (e.g., one composed of or including one or more LEDs and associated driver electronics), the component adjusts the power supplied to the LED(s) to maintain a safe operating temperature, thereby avoiding thermally induced lifetime reduction. (References herein to a single LED are understood to also apply to multiple LEDs, even if not explicitly indicated.) As the component is designed to retrofit existing LED-based lighting devices, it does not contain LEDs or driver electronics itself; rather, the component interfaces with the LED-based lighting device (e.g., an LED bulb) via, for example, a receptacle compatible with the base of the device (e.g., an Edison-style screw base, a bayonet base having radial pins receivable in L-shaped slots in the receptacle, a base having one or more pins such as a bi-pin base, or other conventional configuration). The base of the component (which is typically also, e.g., an Edison-style screw base, a bayonet base having radial pins receivable in L-shaped slots in the receptacle, or a base having one or more pins such as a bi-pin base, or other conventional configuration) in turn connects to the socket in which the LED device was previously insertable. In some embodiments, the LED-based lighting device is configured to be directly wired to a mains voltage via two or three (in cases with a separate ground wire) wires via, e.g., wire nuts in, for example, a junction box. In such embodiments, the component receives the wires within its receptacle (via, e.g., wires and wire nuts or other connectors) and replicates the two or three wires at its base, which may then be connected directly to the mains voltage, e.g., at the junction box. In various embodiments, the component is configured for compatibility with any of a variety of different dimming (or non-dimming) techniques which the LED lighting device utilizes. The component controls power to the LED based on the LED temperature, which is monitored via a temperature sensor. The sensor may be physically within or on the component itself or placed in proximity to the LED and connected to the component by one or more wires or by wireless means of communication.

In an aspect, embodiments of the invention feature a module for providing thermal fold-back protection to an illumination device including or consisting essentially of (i) one or more light-emitting diodes (LEDs), (ii) driver circuitry for converting power received from an external source into a form usable by the LEDs, and (iii) a base receivable into a mating receptacle for at least one of a halogen light bulb, a fluorescent light bulb, or an incandescent light bulb. The illumination device lacks circuitry for decreasing current flow to an LED based on a temperature of the LED. The module includes or consists essentially of a housing, at least one temperature sensor for sensing a temperature of at least one of the LEDs of the illumination device, and disposed within the housing, thermal fold-back circuitry configured for (i) electrical connection with the driver circuitry when the base of the illumination device is received within the module receptacle, and (ii) decreasing current flow to at least one of the LEDs of the illumination device based on the temperature sensed by the at least one temperature sensor. The housing includes or consists essentially of a module receptacle for receiving the base of the illumination device, and a module base receivable into a mating receptacle for at least one of a halogen light bulb, a fluorescent light bulb, or an incandescent light bulb.

Embodiments of the invention feature one or more of the following in any of a variety of different combinations. The temperature sensor may be disposed on or within the housing. The temperature sensor may be (i) external to the housing, (ii) mountable on the illumination device proximate at least one of the LEDs thereof, and (iii) configured for communication with the thermal fold-back circuitry. At least one wire may connect the temperature sensor with the thermal fold-back circuitry. The thermal sensor may communicate wirelessly with the thermal fold-back circuitry. The temperature sensor may include or consist essentially of a thermistor, a thermocouple, and/or a resistance temperature detector. The module base and the base of the illumination device may be of the same type selected from the group consisting of Edison screw bases, bayonet bases, and bi-pin bases. The module base and the base of the illumination device may be of different types selected from the group consisting of Edison screw bases, bayonet bases, and bi-pin bases. The driver circuitry may be configured to supply a dimmed signal to the one or more LEDs in response to a signal from an external dimmer via phase dimming of an input voltage. The thermal fold-back circuitry may be configured to alter a phase angle of the dimmed signal based on the temperature sensed by the at least one temperature sensor. The driver circuitry may be configured to supply a fixed current to the one or more LEDs notwithstanding variations in an input voltage supplied to the illumination device. The thermal fold-back circuitry may be configured to dissipate current over a load in parallel with the one or more LEDs based on the temperature sensed by the at least one temperature sensor.

In another aspect, embodiments of the invention feature a method of retrofitting an illumination device to provide thermal fold-back protection. The illumination device includes or consists essentially of (i) one or more light-emitting diodes (LEDs), (ii) driver circuitry for converting power received from an external source into a form usable by the LEDs, and (iii) a base receivable into a mating receptacle for at least one of a halogen light bulb, a fluorescent light bulb, or an incandescent light bulb. The illumination device lacks circuitry for decreasing current flow to an LED based on a temperature of the LED. A thermal fold-back module is provided. The thermal fold-back module includes or consists essentially of a housing and, disposed within the housing, thermal fold-back circuitry for decreasing current flow to at least one of the LEDs of the illumination device based on a temperature of at least one of the LEDs of the illumination device. The housing includes or consists essentially of a module receptacle for receiving the base of the illumination device and a module base receivable into a mating receptacle for at least one of a halogen light bulb, a fluorescent light bulb, or an incandescent light bulb. The base of the illumination device is received within the module receptacle, thereby electrically connecting the thermal fold-back circuitry and the driver circuitry. A temperature sensor is disposed proximate at least one of the LEDs of the illumination device.

Embodiments of the invention feature one or more of the following in any of a variety of different combinations. The module base may be received within a mating receptacle (i) for at least one of a halogen light bulb, a fluorescent light bulb, or an incandescent light bulb and (ii) for supplying power to the illumination device. Disposing the temperature sensor proximate at least one of the LEDs may include or consist essentially of placing the temperature sensor within or on an external housing of the illumination device, the temperature sensor being connected to the thermal fold-back circuitry by at least one wire. The temperature sensor may be integrated with the module, and the step of receiving the base of the illumination device within the module may cause the temperature sensor to be disposed proximate at least one of the LEDs.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. As used herein, the terms "substantially" and "approximately" mean±10%, and, in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawing, in which.

DETAILED DESCRIPTION

Figure 1:
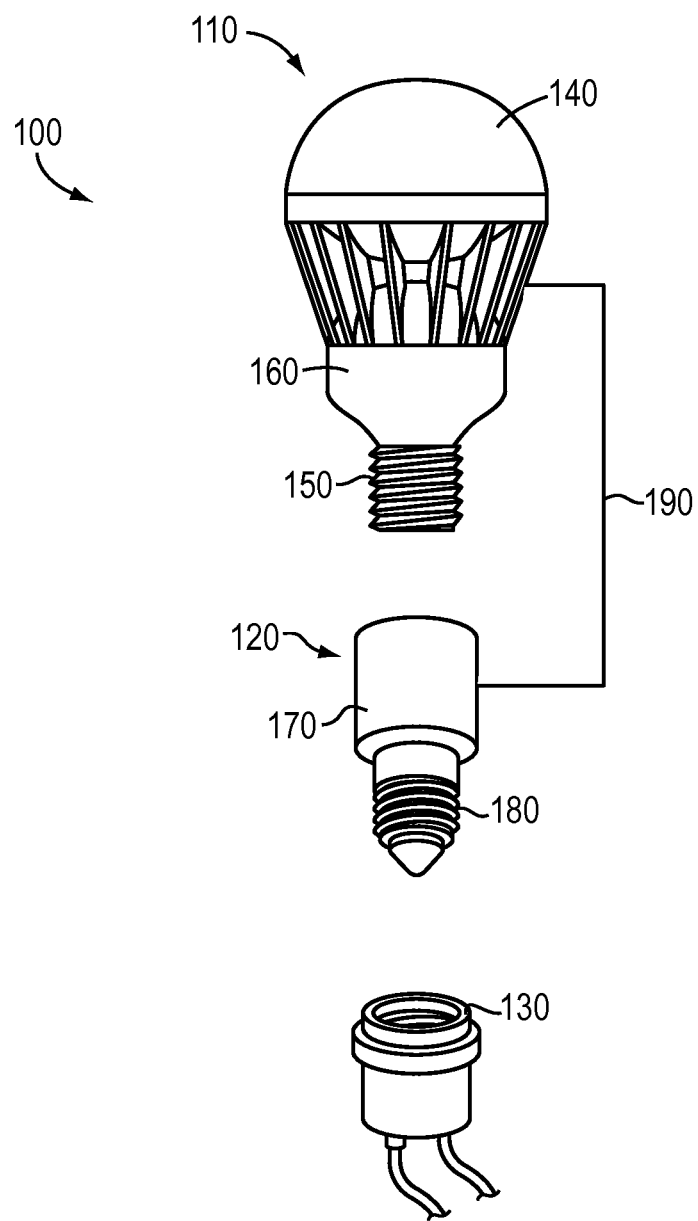
FIGS. 1 and 1B are schematics of illumination systems incorporating thermal fold-back modules in accordance with various embodiments of the invention.

FIG. 1 depicts a lighting system 100 in accordance with various embodiments of the present invention. The system 100 includes an LED lighting device (or "bulb") 110, a thermal fold-back module 120, and a conventional socket 130 for supplying power to the module 120 and, therethrough, to LED bulb 110. The LED bulb 110 includes one or more LEDs therewithin that emit light through a shaped envelope (or lens) 140, a conventional bulb base 150, and an electronics section 160 containing driver circuitry and to which the LED is electrically (and, in some embodiments, physically) connected. The LED bulb 110 typically does not natively incorporate thermal fold-back capability but may be dimmable (as described in more detail below). Thus, LED bulb 110 typically also does not include a temperature sensor (e.g., one or more thermistors) that monitors the temperature of the LEDs therewithin. The LEDs within the LED bulb 110 preferably emit white light but may also emit light of one or more other colors. The LEDs may even emit light of multiple different colors that combine to form white (or other) light. The envelope 140 is typically transparent or translucent and may incorporate a diffuser or even a phosphor material to alter the wavelength (and thus the color) of the light emitted by one or more of the LEDs. The base 150 may be an Edison-type screw-in base with threads of standard size and spacing; or may feature one or more radial (i.e., extending laterally outward from the circumference of the base) pins (i.e., a "bayonet base"); or may feature one or more pins (a bi-pin base in the style of an MR-16 bulb, for example) having a standard diameter and spacing and extending from the bottom of the base. Via base 150, the LED bulb 110 may be inserted into lamps or luminaires as a direct replacement to conventional incandescent, halogen, or fluorescent bulbs. All or part of the envelope 140 preferably has a shape corresponding to or approximating at least a portion of the shape of the conventional bulb meant to be replaced by LED bulb 110. As shown, the envelope may incorporate one or more openings and/or projections or fins (which may be, e.g., part of or thermally coupled to one or more heat sinks within LED bulb 110) to expedite exchange of heat generated within LED bulb 110 (e.g., by the LEDs) with the surrounding environment via convection and/or conduction.

The socket 130 is complementary to the base 150 of the LED bulb 110 and may incorporate or be electrically connected to a dimmer. For example, the socket 130 may be electrically coupled to a switch (e.g., a wall switch) that incorporates a dimmer for dimming the light emitted by LED bulb 110. The socket 130 supplies power (e.g., AC line voltage) to LED bulb 110 where it is converted by the driver in electronics section 160 into a form usable by the LEDs.

In accordance with various embodiments of the invention, the thermal fold-back module 120 features a receptacle 170, a base 180, thermal fold-back circuitry, and one or more temperature sensors. The thermal fold-back circuitry, which decreases the current supplied to the LEDs in LED bulb 110 as their temperature increases (once the LED temperature is above a particular predefined threshold, for example) is contained within the receptacle 170 and/or base 180 and electrically interfaces with the electronics section 160 of LED bulb 110 when base 150 is engaged within receptacle 170. Receptacle 170 incorporates a standard socket configured for compatibility with base 150 and may be similar (or even identical) to socket 130. Similarly, base 180 may be an Edison-type screw-in base with threads of standard size and spacing, a bayonet base, or may feature one or more pins having a standard diameter and spacing and may be similar (or even identical to) base 150.

In other embodiments, base 180 has a different configuration from that of base 150, thus enabling LED bulb 110 to be electrically connected to sockets other than socket 130—i.e., base 180 serves as an adapter. In some embodiments, bases 150 and 180 have the same type or configuration but different sizes and/or spacings between threads or pins, again enabling LED bulb 110 to be electrically connected to sockets other than socket 130. When base 150 is engaged within receptacle 170 and base 180 is engaged within socket 130, the thermal fold-back module 120 conducts power from socket 130 to LED bulb 110 and also adds thermal fold-back capability thereto via the thermal fold-back circuitry within module 120.

Figure 1B:
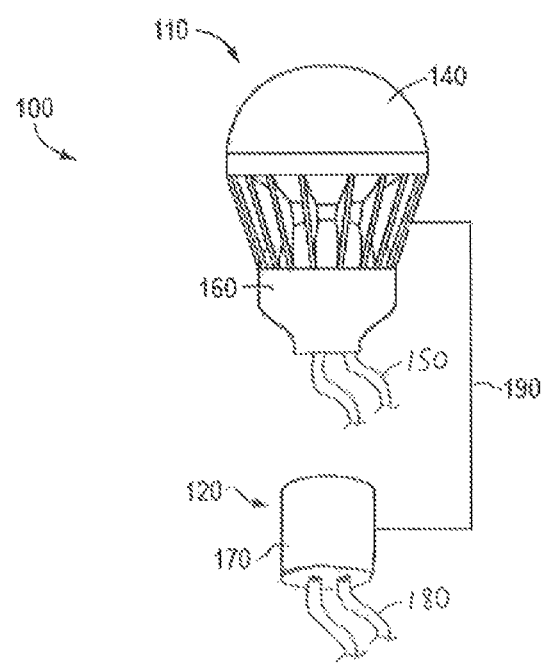

In some embodiments, as depicted in FIG. 1B, the LED bulb 110 has a base 150 composed of multiple (e.g., two or three) wires configured to be directly wired to a mains voltage via e.g., wire nuts, for example at a junction box. In such cases, or in cases in which base 180 serves as an adapter (and thus has a different configuration), the base 180 of the module 120 may be composed of multiple (e.g., two or three) wires and thus be configured for direct wired connection to a mains voltage.

Additionally, module 120 may include one or more temperature sensors (e.g., thermistors, thermocouples, and/or resistance temperature detectors) for sensing the operating temperature of the LED(s) within LED bulb 110. Since the sensor preferably senses the temperature of the LED due to, e.g., heat emitted by the LED during operation, rather than the ambient temperature, the sensor is preferably disposed in close proximity to the LED when module 120 is engaged with LED bulb 110. For example, the sensor may be disposed in or on the top of the receptacle 170 (i.e., proximate to LED bulb 110 when it is engaged to receptacle 170). In other embodiments, the sensor is physically separate from the module 120 and placed in direct contact with LED bulb 110 (near the LED for example). In such cases, as shown in FIG. 1, the sensor may be connected to module 120 via an electrical connection 190 (e.g., one or more wires) in order to communicate temperature data to the thermal fold-back circuitry within module 120. In yet other embodiments, the sensor is placed in contact with the LED bulb 110 but communicates wirelessly with the thermal fold-back circuitry within module 120. In various embodiments, the module 120 provides thermal fold-back protection to LED bulb 110 based on sensed LED temperature in the manner described in U.S. patent application Ser. No. 13/766,196, filed on Feb. 13, 2013, the entire disclosure of which is incorporated by reference herein.

Figure 2:
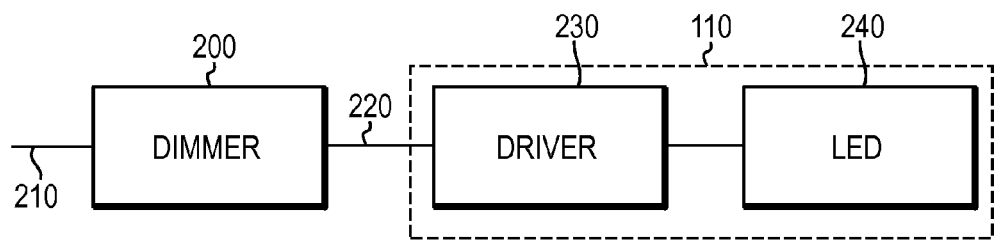
FIG. 2 is a block diagram of an illumination system not incorporating thermal fold-back.

FIG. 2 is a block diagram illustrating an example of portions of system 100 in the absence of the thermal fold-back module 120. As shown, a dimmer 200 (which, as mentioned above, may be a portion of or electrically connected to socket 130) accepts a power signal 210 (e.g., AC line voltage) and outputs a dimmed signal 220 to LED bulb 110. The dimmer 200 may be configured for e.g., phase dimming, 0-10 V dimming, DALI dimming, DMX512 dimming, and/or one or more other dimming schemes. The dimmed signal 220 is translated by the driver electronics 230 within LED bulb 110 and utilized to drive the LED 240. The LED 240 may include or consist essentially of one or more LEDs, e.g., a series-connected string of LEDs.

Figure 3:
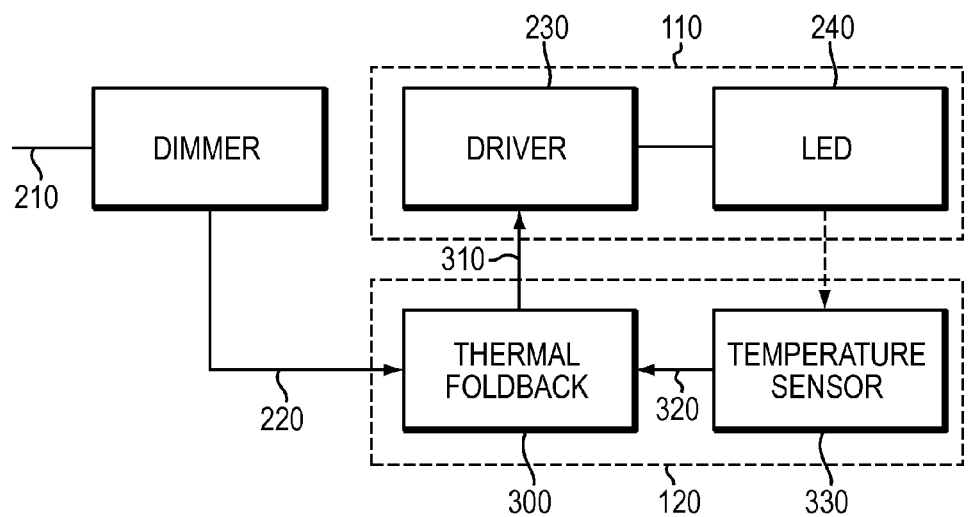
FIG. 3 is a block diagram of the illumination system of FIG. 2 connected to a thermal fold-back module in accordance with various embodiments of the invention.

FIG. 3 illustrates an example of portions of system 100 in the presence of the thermal fold-back module 120. As shown, a thermal fold-back controller 300 within module 120 accepts the dimmed signal 220 from the dimmer and supplies a signal 310 to the LED bulb 110 such that the driver 230 and LED 240 are responsive not only to the dimmer 200 but also to the thermal fold-back circuitry in module 120. That is, the signal 310 is altered to incorporate not only the desired dimming level from dimmer 200 but also, if necessary, to further reduce the duty cycle of the LED 240 in response to increasing temperature thereof. The module 120 also accepts temperature telemetry 320 (i.e., wired or wireless communications) from the LED 240 via one or more temperature sensors 330. The temperature sensor 330 may include or consist essentially of one or more thermistors, thermocouples, resistance temperature detectors, and/or other temperature sensors and is preferably in proximity to the LED 240 within or on LED bulb 110.

The thermal fold-back controller 300 may be a general-purpose microprocessor, but depending on implementation may alternatively be a microcontroller, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of embodiments of the invention. Moreover, at least some of the functions of thermal fold-back controller 300 may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to a microprocessor resident in thermal fold-back controller 300. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

Figure 4A:
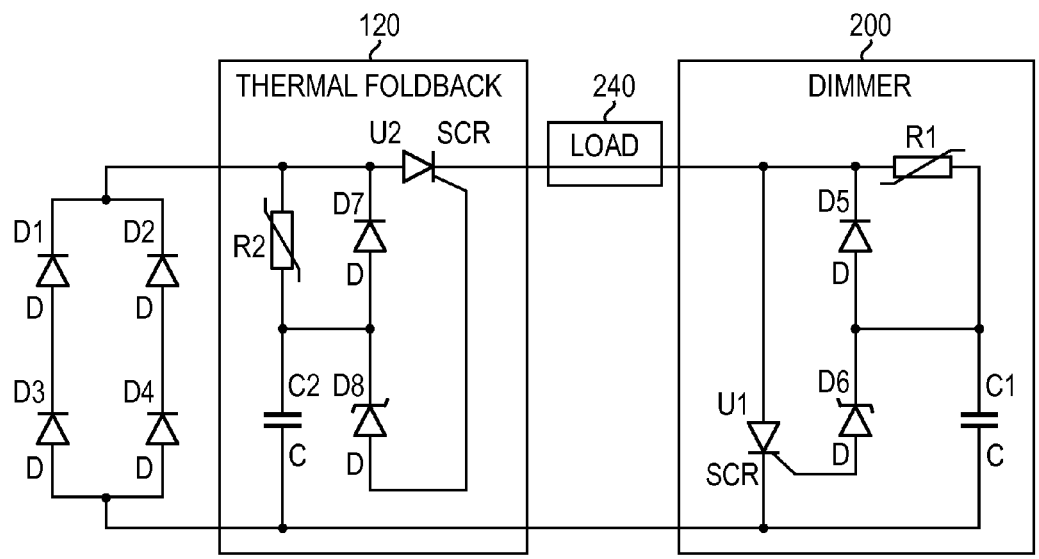
FIG. 4A is a circuit diagram of an illumination system incorporating a phase-dimming dimmer and a thermal fold-back module in accordance with various embodiments of the invention.
Figure 4B:
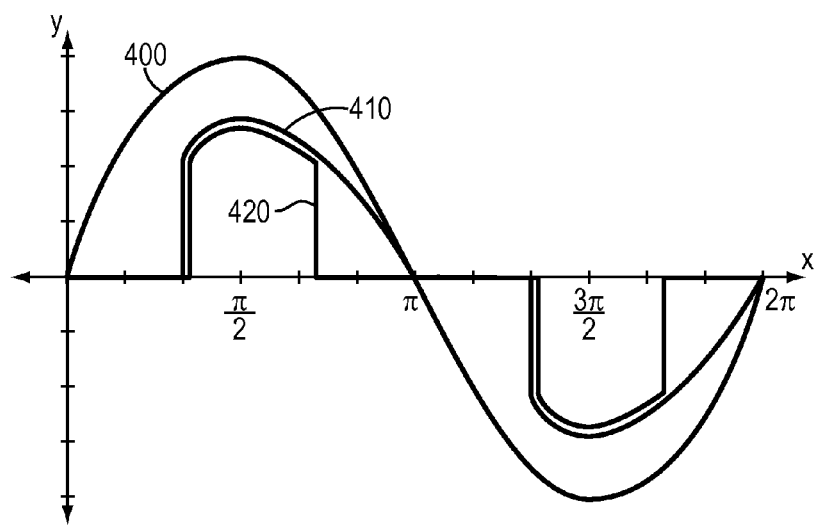
FIG. 4B is a graph depicting an AC input voltage and corresponding currents controlled by a phase dimmer and by the dimmer and a thermal fold-back module in accordance with various embodiments of the invention.

FIG. 4A illustrates portions of a system 100 connected to a phase-dimming dimmer and incorporating a thermal fold-back module 120. In the illustrated embodiment, the module 120 alters the phase angle presented by dimmer 200 based on the temperature of the LED 240. Within the dimmer 200, a resistor R1 and a capacitor C1 form an RC network that biases an SCR D6 to adjust the amount of time that the SCR U1 is in conduction mode—the lower the resistance of adjustable resistor R1, the longer that SCR U1 remains on for each waveform cycle. As shown in FIG. 4B, during operation of the phase-dimming dimmer 200, a sinusoidal AC input voltage 400 is transformed into an input current 410 that resembles a sinusoid with the leading edge of each cycle chopped to zero.

With reference to FIG. 4A, in accordance with various embodiments of the invention, once the thermal fold-back module 120 is incorporated into the system 100 (i.e., connected between the LED bulb 110 and socket 130 that is connected to the dimmer 200), the module 120 further alters the phase of the input waveform in response to the temperature of the LED 240. The module 120 incorporates a thermistor R2 having a positive temperature coefficient, i.e., the resistance of thermistor R2 increases with increasing temperature. The thermistor R2 is preferably disposed physically in close proximity to the LED 240. As shown in FIG. 4B, the trailing edge of each cycle of an input signal 420 is chopped to zero potential based on the response of SCR U2 to the thermistor R2. In this manner, the module 120, once incorporated into the system 100, provides thermal fold-back protection to the LED 240 without disrupting the operation of the dimmer 200.

Figure 5:
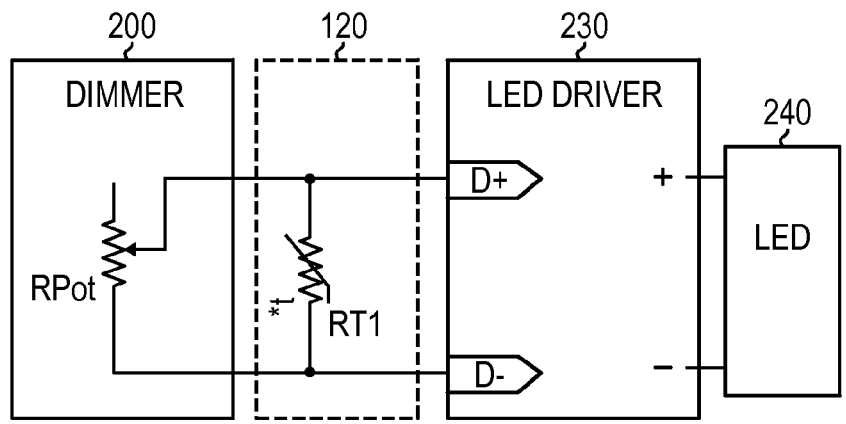
FIG. 5 is a schematic diagram of various components of an illumination system incorporating a 0-10 V dimmer and a thermal fold-back module in accordance with various embodiments of the invention.

FIG. 5 illustrates portions of illumination system 100 connected to a dimmer 200 configured for 0-10 V dimming. In such embodiments of the invention, the thermal fold-back module 120 produces an analog voltage based on the operating temperature of the LED and added to the dimming signal, if any, produced by the dimmer 200. As shown in FIG. 5, a negative temperature coefficient thermistor RT1 acts as the temperature sensor and is mounted in thermal contact with the LED or the housing of LED bulb 110 proximate the LED. As the LED temperature increases, the resistance of thermistor RT1 decreases, lowering the voltage on the D+ wire and thereby controlling the driver 230 to dim the LED.

Figure 6:
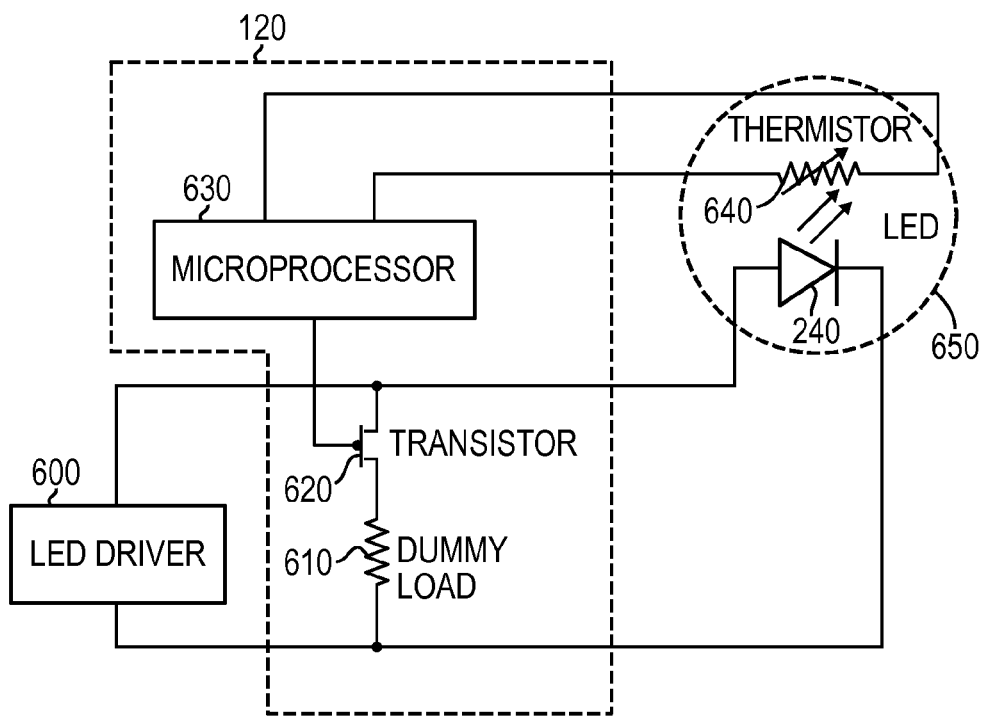
FIG. 6 is a schematic diagram of various components of an illumination system incorporating a non-dimming driver and a thermal fold-back module in accordance with various embodiments of the invention.

FIG. 6 shows portions of an illumination system 100 utilizing a non-dimming LED driver 600 within the LED bulb 110. As known to those of skill in the art, non-dimming LED drivers are generally designed to provide a fixed constant current to an LED regardless of changes in input voltage. Thus, attempts to connect to such drivers phase-cutting dimming circuitry may result in malfunctions or even damage to one or both of the circuits themselves. The driver 600, which is conventional, adjusts the drive voltage to maintain a constant total current regardless of other loads in the circuit; thus, placement of a load in parallel with the LED in LED bulb 110 shunts current away and thus reduces power dissipation in the LED itself. The load is preferably configured to dissipate the power (and concomitant heat) corresponding to the current-voltage product of the bypassed current and a voltage approximately equal to the forward voltage of the LED. Embodiments of the present invention utilize a switch (e.g., one or more transistors) biased by a signal proportional to the LED temperature to pass current in parallel to the LED, thereby reducing the drive current to the LED and maintaining the LED temperature in a safe operating range. Although such dissipated current is "wasted," it is typically only dissipated when the LED temperature approaches dangerously high levels.

As shown in FIG. 6, the LED 240 is powered by the non-dimming driver 600. When the thermal fold-back module 120 is incorporated into system 100, it places a resistor (or other "dummy load") 610 in parallel with the LED 240. Current to the resistor 610 is regulated via a transistor (or other switch) 620 in series with resistor 610. Operation of the transistor 620 provides more or less current to drive the LED 240, as desired. The transistor 620 is controlled by, e.g., a microprocessor 630 (or equivalent analog circuitry). The microprocessor 630 receives a temperature-dependent signal from a thermistor (or other temperature sensor) 640 that is physically in close proximity to the LED 240—for example, within a thermal pathway 650 of the LED. Based on the received signal, the microprocessor 630 biases the transistor 620 to reduce current flow to LED 240 if the temperature of the LED 240 approaches dangerous levels.

The microprocessor 630 may be a general-purpose microprocessor, but depending on implementation may alternatively be a microcontroller, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of embodiments of the invention. Moreover, at least some of the functions of microprocessor 630 may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to microprocessor 630. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A module for providing thermal fold-back protection to an illumination device, the illumination device comprising (i) one or more light-emitting diodes (LEDs), (ii) driver circuitry for converting power received from an external source into a form usable by the LEDs, and (iii) a base receivable into a mating receptacle for at least one of a halogen light bulb, a fluorescent light bulb, or an incandescent light bulb, the illumination device lacking circuitry for decreasing current flow to an LED based on a temperature of the LED, the module comprising:
    a housing comprising:
        a module receptacle for receiving the base of the illumination device, and
        a module base receivable into a mating receptacle for at least one of a halogen light bulb, a fluorescent light bulb, or an incandescent light bulb;
    at least one temperature sensor for sensing a temperature of at least one of the LEDs of the illumination device; and
    disposed within the housing, thermal fold-back circuitry configured for (i) electrical connection with the driver circuitry when the base of the illumination device is received within the module receptacle, and (ii) decreasing current flow to at least one of the LEDs of the illumination device based on the temperature sensed by the at least one temperature sensor,
    wherein the module does not contain driver electronics for converting power received from an external source into a form usable by the LEDs of the illumination device.

2. The module of claim 1, wherein the temperature sensor is disposed on or within the housing.

3. The module of claim 1, wherein the temperature sensor is (i) external to the housing, (ii) mountable on the illumination device proximate at least one of the LEDs thereof, and (iii) configured for communication with the thermal fold-back circuitry.

4. The module of claim 3, further comprising at least one wire connecting the temperature sensor with the thermal fold-back circuitry.

5. The module of claim 3, wherein the thermal fold-back circuitry is configured to receive wireless communications from the thermal sensor.

6. The module of claim 1, wherein the temperature sensor comprises at least one of a thermistor, a thermocouple, or a resistance temperature detector.

7. The module of claim 1, wherein the module base and the base of the illumination device are of the same type selected from the group consisting of Edison screw bases, bayonet bases, and bi-pin bases.

8. The module of claim 1, wherein the module base and the base of the illumination device are of different types selected from the group consisting of Edison screw bases, bayonet bases, and bi-pin bases.

9. The module of claim 1, wherein (i) the driver circuitry is configured to supply a dimmed signal to the one or more LEDs in response to a signal from an external dimmer via phase dimming of an input voltage, and (ii) the thermal fold-back circuitry is configured to alter a phase angle of the dimmed signal based on the temperature sensed by the at least one temperature sensor.

10. The module of claim 1, wherein (i) the driver circuitry is configured to supply a fixed current to the one or more LEDs notwithstanding variations in an input voltage supplied to the illumination device, and (ii) the thermal fold-back circuitry is configured to dissipate current over a load in parallel with the one or more LEDs based on the temperature sensed by the at least one temperature sensor.

11. A method of retrofitting an illumination device to provide thermal fold-back protection, the illumination device comprising (i) one or more light-emitting diodes (LEDs), (ii) driver circuitry for converting power received from an external source into a form usable by the LEDs, and (iii) a base receivable into a mating receptacle for at least one of a halogen light bulb, a fluorescent light bulb, or an incandescent light bulb, the illumination device lacking circuitry for decreasing current flow to an LED based on a temperature of the LED, the method comprising:
    providing a thermal fold-back module comprising (i) a housing comprising (a) a module receptacle for receiving the base of the illumination device, and (b) a module base receivable into a mating receptacle for at least one of a halogen light bulb, a fluorescent light bulb, or an incandescent light bulb, and (ii) disposed within the housing, thermal fold-back circuitry for decreasing current flow to at least one of the LEDs of the illumination device based on a temperature of at least one of the LEDs of the illumination device, wherein the module does not contain driver electronics for converting power received from an external source into a form usable by the LEDs of the illumination device;
    receiving the base of the illumination device within the module receptacle, thereby electrically connecting the thermal fold-back circuitry and the driver circuitry such that, when the module base is received into the mating receptacle, power is conducted to the illumination device without conversion, within the module, into a form usable by the LEDs; and
    disposing a temperature sensor proximate at least one of the LEDs of the illumination device.

12. The method of claim 11, further comprising receiving the module base within a mating receptacle (i) for at least one of a halogen light bulb, a fluorescent light bulb, or an incandescent light bulb and (ii) for supplying power to the illumination device.

13. The method of claim 11, wherein disposing the temperature sensor proximate at least one of the LEDs comprises placing the temperature sensor within or on an external housing of the illumination device, the temperature sensor being connected to the thermal fold-back circuitry by at least one wire.

14. The method of claim 11, wherein the temperature sensor is integrated with the module, the step of receiving the base of the illumination device within the module receptacle causing the temperature sensor to be disposed proximate at least one of the LEDS.

15. A module for providing thermal fold-back protection to an illumination device, the illumination device comprising (i) one or more light-emitting diodes (LEDs), (ii) driver circuitry for converting power received from an external source into a form usable by the LEDs, and (iii) a plurality of wires for connecting the illumination device to a mains voltage, the illumination device lacking circuitry for decreasing current flow to an LED based on a temperature of the LED, the module comprising:
- a housing comprising:
  - a module receptacle for receiving the plurality of wires of the illumination device and
  - a module base comprising a plurality of wires connectable to a mains voltage;
- at least one temperature sensor for sensing a temperature of at least one of the LEDs of the illumination device; and
- disposed within the housing, thermal fold-back circuitry configured for (i) electrical connection with the driver circuitry when the plurality of wires of the illumination device are received within the module receptacle, and (ii) decreasing current flow to at least one of the LEDs of the illumination device based on the temperature sensed by the at least one temperature sensor,
- wherein the module does not contain driver electronics for converting power received from an external source into a form usable by the LEDs of the illumination device.

16. The module of claim 15, wherein the temperature sensor is disposed on or within the housing.

17. The module of claim 15, wherein the temperature sensor is (i) external to the housing, (ii) mountable on the illumination device proximate at least one of the LEDs thereof, and (iii) configured for communication with the thermal fold-back circuitry.

18. The module of claim 17, further comprising at least one wire connecting the temperature sensor with the thermal fold-back circuitry.

19. The module of claim 15, wherein (i) the driver circuitry is configured to supply a dimmed signal to the one or more LEDs in response to a signal from an external dimmer via phase dimming of an input voltage, and (ii) the thermal fold-back circuitry is configured to alter a phase angle of the dimmed signal based on the temperature sensed by the at least one temperature sensor.

20. The module of claim 15, wherein (i) the driver circuitry is configured to supply a fixed current to the one or more LEDs notwithstanding variations in an input voltage supplied to the illumination device, and (ii) the thermal fold-back circuitry is configured to dissipate current over a load in parallel with the one or more LEDs based on the temperature sensed by the at least one temperature sensor.

* * * * *